United States Patent [19]

Nicholson

[11] 4,387,904
[45] Jun. 14, 1983

[54] GASKETS

[76] Inventor: Terence P. Nicholson, Calf Hall, Muggleswick, Derwentside, County Durham, England

[21] Appl. No.: 238,616

[22] Filed: Feb. 26, 1981

[51] Int. Cl.³ .............................................. F16J 15/08
[52] U.S. Cl. ................................................ 277/235 B
[58] Field of Search ................ 277/235 A, 235 B, 236

[56] References Cited

U.S. PATENT DOCUMENTS 4,196,913  4/1980  Oka ................................... 277/235 B
4,290,616  9/1981  Nicholson ........................ 277/235 B
4,312,512  1/1982  Conte .............................. 277/235 B

FOREIGN PATENT DOCUMENTS 2331510  6/1973  Fed. Rep. of Germany ... 277/235 B

Primary Examiner—Robert I. Smith
Attorney, Agent, or Firm—Murray Schaffer

[57] ABSTRACT

A gasket for sealing the joint between the cylinder head and exhaust manifold of an internal combustion engine comprises a flat sheet metal base layer (1) having an opening or openings (A) therein corresponding to the number of cylinder head and exhaust manifold ports around which a seal is required, a second layer in the form of a radially corrugated metal annulus or annuli (2) applied to the base layer (1) around the or each opening (A), with the radially inner parts of the or each annulus (2g) spaced apart from the base layer (1) around the or each opening (A), and a sheet metal layer (D) which effectively increases the thickness of the base layer (1) in regions of the base layer which surround securing stud apertures (C) therein. The layer (D) may be formed by folding over the base layer sheet (1) or alternatively it may be a separately attached sheet metal layer.

4 Claims, 3 Drawing Figures

GASKETS

This invention relates to a gasket for sealing the joint between the cylinder head and exhaust manifold of an internal combustion engine.

Due to the very high gas pressures and temperatures involved in the operation of a turbo charged diesel engine and the relative elasticity of the metal used in its construction it is found that when such an engine is running under full load a conventionally constructed manifold distorts or bows thus allowing unacceptable leakage of exhaust gas between the cylinder head and the exhaust manifold.

The present inventor's researches have suggested that a satisfactory gasket for the purpose referred to needs (a) to possess a degree of resilience to accommodate itself to the elasticity in the manifold and therefore must be corrugated, (b) to be self-energizing in that sealing is promoted by pressure of gas existing at the joint and (c) to be protected against corrugation flattening adjacent the points of application of clamping pressure.

There has thus been devised in accordance with the present invention a gasket for sealing a joint between a cylinder head and an exhaust manifold comprising a sheet metal base layer having an opening or openings therein corresponding to the number of cylinder head and exhaust manifold exhaust ports around which a seal is required; a second layer in the form of a radially corrugated metal annulus or annuli applied to the base layer around the or each opening, with the radially inner parts of the or each annulus spaced apart from the base layer around the or each opening; and a sheet metal layer on the same face of the sheet metal base layer as the second layer, which effectively increases the thickness of the base layer in regions of the base layer which surround securing stud apertures therein.

Preferably each annulus is secured to the base layer sheet by peripherally spaced spot welds. The thickness-increasing sheet metal layer which surrounds each securing stud aperture may be formed by folding over the base layer sheet material or it may be a separately applied and secured sheet metal layer. The gasket will normally be made exclusively of stainless steel.

A preferred embodiment of the gasket in accordance with the invention is illustrated by way of example in the accompanying drawings to which reference is hereinafter made.

Figure 1:
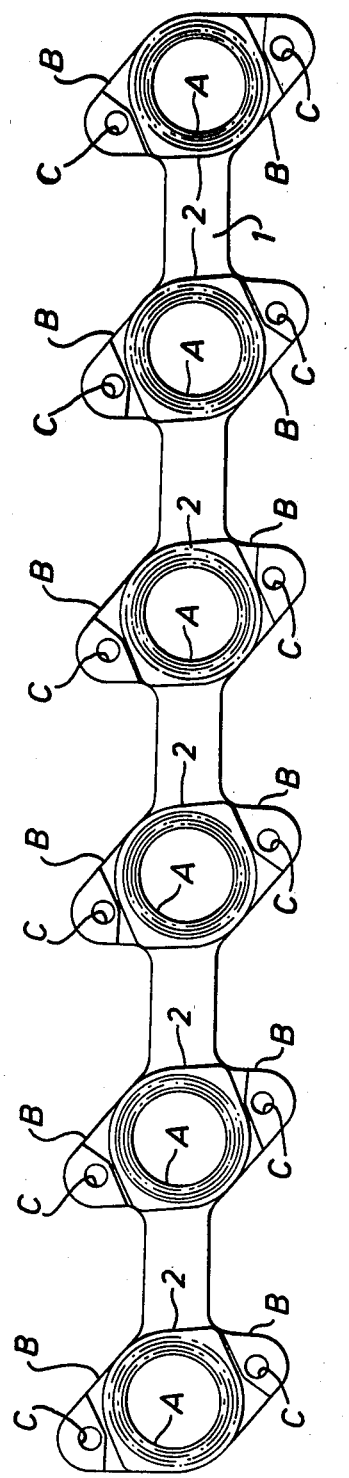
FIG. 1 is a plan view of a single piece exhaust manifold gasket intended for a six-cylinder turbo-charged diesel engine.

Referring now to the drawings the elongated gasket therein illustrated is made of stainless steel and has six 47 mm. diameter port apertures A. Additionally it has twelve lugs B each formed with an 11 mm. diameter hole C intended to receive a stud attached to a cylinder head.

The gasket conprises a full length base layer sheet 1 defining the apertures A, lugs B and holes C and of 0.38/0.37 mm. thickness. The sheet 1 is radially corrugated around the margin of each aperture A.

Figure 3:
FIG. 3 is an enlarged scale section on line III—III of FIG. 2.

Imposed upon one face of the sheet 1 concentric with the apertures A is a series of six radially corrugated 0.25 mm. thickness sheet metal annuli 2. As shown in FIG. 3 the corrugations of each annulus 2 are complementary to and nest with the corrugations of the base layer sheet 1. It is to be noted further that the radially innermost part of each annulus is plane and spaced apart and parallel to the adjacent part of the base layer sheet 1 to form a gap g. The overall thickness of the gasket at each such region is 1.13 mm, thus defining a gap distance g of about 0.5 mm.

Each of the annuli 2 is fixed to the base layer sheet 1 by weld tabs w the disposition of which around the central opening may be varied to suit production methods.

Figure 2:
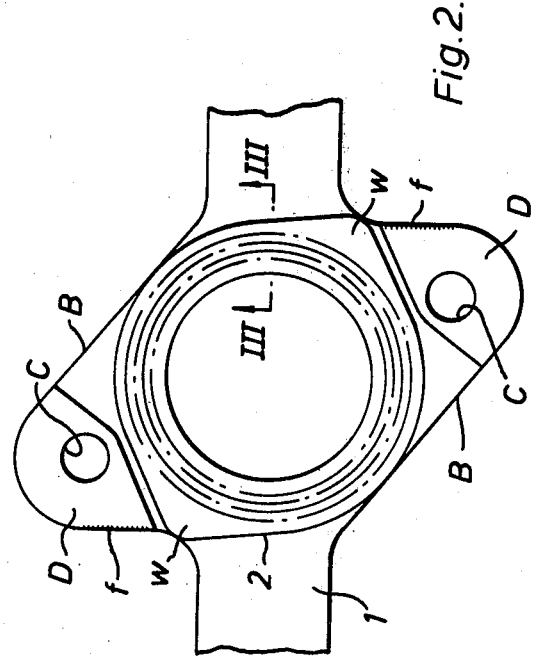
FIG. 2 is a developed plan view of part of the gasket shown in FIG. 1 to illustrate constructional details.

As shown most clearly in FIG. 2 each lug B has its thickness around the stud hole C effectively doubled by folding over the sheet 1 along the line f to form the layer D. As an alternative to folding over the base layer sheet 1 the layer D could be provided by separately attached sheet material.

The action of the improved gasket may be summarised as follows:

When a manifold deforms, the gap which it creates is at its greatest across the centre line of a central aperture and decreases towards each of the two studs adjacent that aperture. The corrugations around each of the apertures A act as a series of circular concentric springs and the hoop stresses in these rings not only resist the clamping load applied through the studs but also enable the gasket to recover its almost original configuration. The gasket thus becomes a truly active element between cylinder head and exhaust manifold, whereby it can cope with all vibrations, expansions, contractions and distortions which may occur.

Each annulus 2 effectively becomes an integral part of the gasket although it has been manufactured separately and is subsequently affixed to the base sheet by welding after both components have been cleaned and pressed together under very high pressure.

The already mentioned gap between the radially inner part of each annulus and the adjacent part of the base sheet admits high pressure exhaust gas, which, acting in the manner of a wedge, has the effect of forcing the metal layers of the gasket into even more intimate sealing engagement with the cylinder head and the exhaust manifold respectively to form a perfect seal. It is found that because of the radially outwardly decreasing gap width and labyrinth effect of the mating corrugations there is no outside gas leakage even though the base layer sheet and annuli are not brazed or welded together over the whole of their nesting surfaces.

Finally, if the corrugations were allowed to be compressed into a perfectly flat condition, which could well happen in close proximity to the studs, they can and do crack at the peaks and valleys of the corrugations through metal fatigue. It is for this reason that the sheet material effective thickness is at these locations increased by attaching or folding over sheet material. This enables the lugs of the manifold to be firmly clamped to a solid face whilst at the same time preventing the corrugations from being over clamped.

In engine tests to compare the efficiency of a conventional gasket with that of one manufactured as hereinbefore described according to the invention, it was found that under the same operating conditions a conventional gasket failed after 5 hours while the invented gasket operated successfully for upwards of 400 hours. The ultimate life of the invented gasket could not be established by that engine test as it had to be terminated for other reasons.

I claim:

1. A gasket for sealing a joint between a cylinder head and an exhaust manifold, comprising a sheet metal base layer having openings therein corresponding to the number of cylinder head and exhaust manifold exhaust ports around which a seal is required, a second layer applied to the base layer having a radially corrugated metal annulus for each opening, with the radially inner parts of each annulus spaced apart from the base layer around the corresponding opening, and a sheet metal layer effectively increasing the thickness of the base layer in regions of the base layer surrounding securing stud apertures therein.

2. A gasket in accordance with claim 1 wherein each annulus is secured to the base layer sheet by peripherally spaced spot welds.

3. A gasket in accordance with claim 1 or claim 2 wherein the thickness-increasing sheet metal layer which surrounds each securing stud aperture is formed by folding over the base layer sheet material.

4. A gasket in accordance with claim 1 or claim 2 wherein the thickness-increasing sheet metal layer which surrounds each securing stud aperture is a separately applied and secured sheet metal layer.

* * * * *